United States Patent [19]
Ueda

[11] Patent Number: 5,586,239
[45] Date of Patent: Dec. 17, 1996

[54] COMPUTER CONTROLLED GRAPHICS DISPLAY SYSTEM FOR SUPPORTING INFORMATION CLASSIFICATION

[75] Inventor: Manabu Ueda, Kawasaki, Japan

[73] Assignee: Fuji Xerox Co., Ltd., Japan

[21] Appl. No.: 492,537

[22] Filed: Jun. 20, 1995

Related U.S. Application Data

[63] Continuation of Ser. No. 961,545, Oct. 15, 1992, abandoned.

[30] Foreign Application Priority Data

Oct. 17, 1991 [JP] Japan .................... 3-269602

[51] Int. Cl.$^6$ ..................... G06F 15/00
[52] U.S. Cl. ............ 395/774; 395/133; 395/326
[58] Field of Search ................... 395/133, 155, 395/159–161, 148, 145–147

[56] References Cited

U.S. PATENT DOCUMENTS

| | | | |
|---|---|---|---|
| 4,956,773 | 11/1990 | Saito et al. | 395/159 |
| 5,187,788 | 2/1993 | Marmelstein | 395/700 |
| 5,261,037 | 11/1993 | Tse et al. | 395/76 |
| 5,287,439 | 2/1994 | Koga et al. | 395/133 |
| 5,404,439 | 4/1995 | Moran et al. | 395/155 |

OTHER PUBLICATIONS

Ceres Software, Inspiration User's Manual (Japanese Version), (Publication date unknown).
Conklin, "Hypertext: An Introduction and Survey", IEEE Computer. Sep. 1987.
Halasz, "Reflections on Notecards: Seven Issues for the Next Generation of Hypermedia Systems", CACM, v. 31, n. 7. Jul. 1988.
Halasz, "Issues in the Design of Hypermedia Systems", CHI '90 Tutorial. Jan. 1990.
Claris MacWrite II User's Guide, Claris Corp. pp. 5–24. Jan. 1989.
Inspiration User's Manual, Ceres Software, Inc., pp. 47, 49, 60, 64, 71–73. Jan. 1991.

Primary Examiner—Heather R. Herndon
Assistant Examiner—Joseph R. Burwell
Attorney, Agent, or Firm—Welsh & Katz, Ltd.

[57] ABSTRACT

An information classification support apparatus which classifies data units graphically displayed on a display screen. A pointing device designates one or more of the data units on the display screen for each symbol mark to assign the symbol mark and the corresponding classification attribute to the designated data units. The symbol mark is displayed as to surround each of the designated data units. A selecting device selects one symbol mark for classification to move, copy or delete the data units assigned with the symbol mark.

10 Claims, 12 Drawing Sheets

SYMBOL MARK DATA OF SYMBOL MARK
FORMED BY CHARACTERS AND GRAPHICS

OBJECT ON SCREEN

CALCULATION OF DIFFERENCE IN
DIFFERENCE Y-DIRECTION

DIFFERENCE
IN X-DIRECTION

DEFORMATION OF SYMBOL MARK
ACCORDING TO DIFFERENCE

ADDITION OF SYMBOL MARK

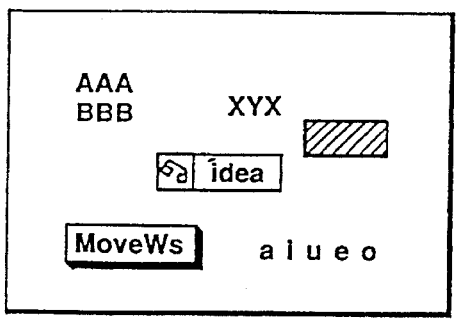
FIG. 13(a)
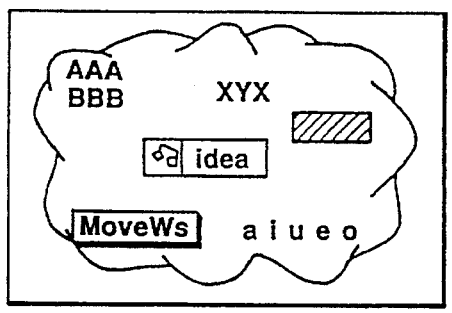 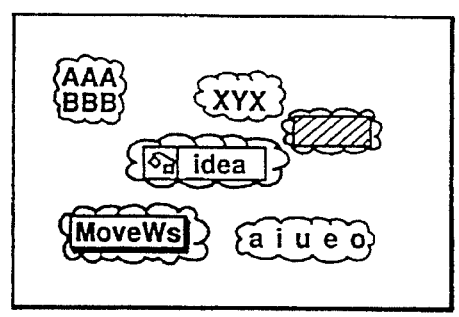
FIG. 13(b)  FIG. 13(c)

COMPUTER CONTROLLED GRAPHICS DISPLAY SYSTEM FOR SUPPORTING INFORMATION CLASSIFICATION

This is a continuation of application, Ser. No. 07/961, 545, filed Oct. 15, 1992, now abandoned.

BACKGROUND OF THE INVENTION

1. Field of the Invention

The present invention relates to an information classification supporting apparatus for supporting the classification of information.

2. Description of the Related Art

A hypertext is a methodology for linking together a plurality of items of electronic data. It is a network-like collection of data which is prepared by systematically managing the items of data, divided into logical units, in units called nodes, and by expressing the linkage between the nodes by means of links.

Such a hypertext is a text which is arranged by making maximum use of characteristics of a computer without adhering to the format of a document printed on paper (a so-called linear document).

A hypertext system is capable of performing documentation support, documentation management, document retrieval, multimedia data management, and multimedia data retrieval in an integrated manner.

As conventional hypertext systems, those disclosed in a document "Hypertext: An Introduction and Survey. IEEE Computer, 20, 9, 17–41. Chapel Hill, N.C. 1987" are known.

As an example of such a hypertext system, the NoteCards System (marketed on March 1985) which was developed at the Palo Alto Institute of Xerox Corp. of the United States is known. This NoteCards System realized an environment in which a text editor, a sketch editor, a graph editor, a bit-map editor, and the like which are displayed on a display unit of a personal computer are handled as nodes (called cards in the NoteCards) of the hypertext, and data of such as articles, manuals, and textbooks is registered on the cards. In this environment, the cards are freely interlinked by means of the links to form a network, and the network is stored in a file.

The links of the NoteCards can be located at arbitrary positions in all the cards as visualized pointers, or the links can be stored as internal properties of the cards without being displayed in the cards. In addition, the cards and links of the NoteCards can be arbitrarily prepared by the users and registered in the system.

Furthermore, the NoteCards provide a browsing function in which the configuration of the overall network is filtered depending on the properties of the cards and the links and the direction and depth of the links, and is then visually displayed and edited. Also, the NoteCards provides a cross file link mechanism in which the links provide correspondence between the cards in an independent network in units of files on the one hand, and the cards in a different network on the other. This cross file link mechanism is described in a document "NoteCards in a Nutshell. Proceedings of the ACM CHI+GI Conference (pp. 45–52). Toronto. 1987)."

As for the hypertext technique, research and development have been conducted in two aspects, i.e., for the purpose of managing and expressing information and for the purpose of supporting ideas through the sorting out and classification of knowledge.

Conventionally, however, a hypertext system of a sort which automates the sorting out and classification of qualitative information, which is difficult to numerically process, has not, of course, been realized, nor has it been developed. The reason for this is that, to completely automate the sorting out and classification of knowledge, highly sophisticated techniques, including expression of knowledge, an inference mechanism, and a cognitive mechanism of qualitative information which are based on artificial intelligence (AI) techniques, become essential.

Accordingly, in the above-described conventional hypertext system, in performing the operation of the sorting out and classification of qualitative information, it has been necessary to manually perform a visual classifying operation such as the KJ method (a technique developed by the anthropologist Jiro Kawakita, and so called after his initials). In addition, it has been necessary for a human being to recognize information within a node or window of a hypertext or information on a graphics editor and determine the classification thereof, and to manually move the information by means of a pointing device such as a mouse in accordance with that classification. For this reason, the operation of sorting out and classification of qualitative information has been complicated, and much time has been required in the operation.

It should be noted that the KJ method is a method in which, with regard to the respective fields of the future, the near future, the unknown, and the unexperienced, facts, opinions, and conceptions are grasped as linguistic data, and diagrams synthesizing them through affinity among them are prepared on cards, so as to clarify the sources and forms of problems to be solved.

SUMMARY OF THE INVENTION

Accordingly, it is an object of the present invention to provide an information classification supporting apparatus for supporting the classifying operation of qualitative information, and capable of readily effecting an operation with respect to the qualitative information after classification.

To this end, in accordance with one aspect of the invention, there is provided an information classification supporting apparatus comprising: adding means for adding information for classification to data displayed on a display screen, in accordance with designation information; and moving means for moving the data with the information for classification added thereto, on the display screen in accordance with a property of the information for classification. Hence, in accordance with this aspect of the invention, the data with the information for classification added thereto by the adding means is moved and sorted out by the moving means in accordance with the property of the information for classification.

In accordance with another aspect of the invention, there is provided an information classification supporting apparatus comprising: adding means for adding information for classification to data displayed on a display screen, in accordance with designation information; and transcribing means for transcribing the data with the information for classification added thereto onto a predetermined data storage area corresponding to a property of the information for classification. Hence, in accordance with this aspect of the invention, the data with the information for classification added thereto by the adding means is transcribed onto a predetermined data storage area corresponding to the property of the information for classification and is stored therein.

BRIEF DESCRIPTION OF THE DRAWINGS

FIGS. 13(a) to 13(c) are diagrams illustrating an example of application of templates to elements in accordance with the embodiment.

DESCRIPTION OF THE PREFERRED EMBODIMENT

Referring now to the accompanying drawings, a description will be given of an embodiment of the present invention.

Figure 1:
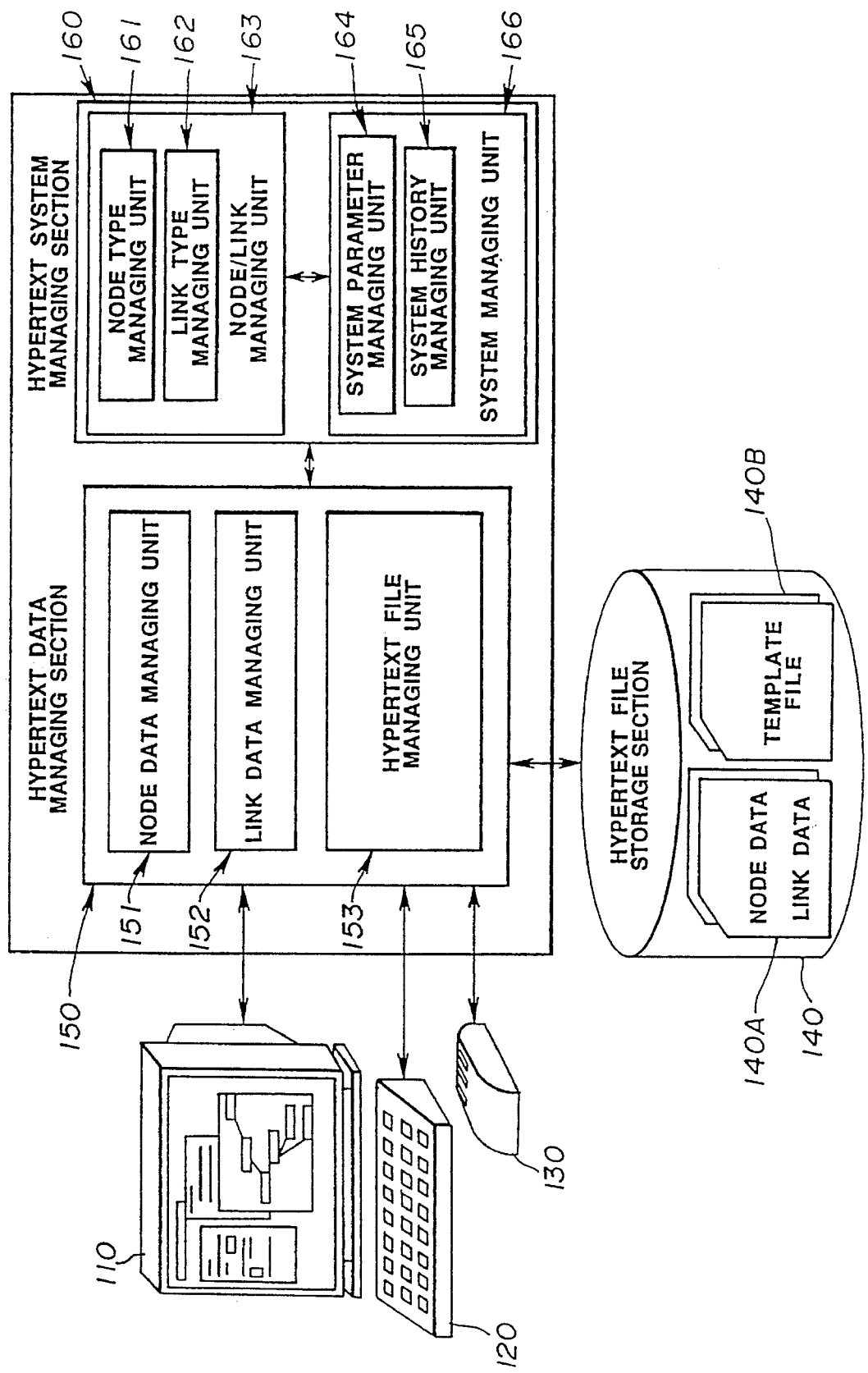
FIG. 1 is a functional block diagram illustrating an embodiment of an information classification supporting apparatus in accordance with the present invention.

FIG. 1 is a functional block diagram of an embodiment of an information classification supporting apparatus in accordance with the present invention. The apparatus of the embodiment shown in FIG. 1 can be applied to a hypertext apparatus.

In the drawing, the information classification supporting apparatus comprises a display unit 110 for displaying a hypertext; a keyboard 120 and a mouse 130 serving as input devices for inputting various data, commands and the like; a hypertext file storage section 140 for storing hypertext files 140A and template files (details will be described later) 140B a hypertext data managing section 150; and a hypertext system managing section 160.

The hypertext data managing section 150 includes a node data managing unit 151, a link data managing unit 152, and a hypertext file managing unit 153. The node data managing unit 151 manages the data of the nodes, such as the type, title, contents, properties, and links as well as histories thereof. The link data managing unit 152 manages the data of the links, such as the type, source nodes, and destination nodes as well as histories thereof. The hypertext file managing unit 153 manages the copy, repair, and version management, collection, and the like in units of hypertext files.

The hypertext system managing section 160 includes a node/link type managing unit 163 having a node type managing unit 161 and a link type managing unit 162, as well as a system managing unit 166 having a system parameter managing unit 164 and a system history managing unit 165.

The node type managing unit 161 manages the types of nodes, such as document (text) node, graphics (sketch) node, and graph node, while the link type managing unit 162 manages the types of links.

In addition, the node type managing unit 161 has four functions which are explained below.

(1) A function in which symbol marks serving as information for classification are added to respective items of information scattered on a display screen, and the relationships between the symbol marks and the information with the symbol marks added thereto are recorded and managed.

(2) A function in which the information with the symbol marks added thereto is moved on the display screen in accordance with the properties of the symbol marks.

(3) A function in which correspondence is provided between the properties of the symbol marks and the nodes of the hypertext, and the information with the symbol marks added thereto is transcribed (copied) onto the nodes.

(4) A function in which the node having the template function manages processing necessary for accessing a template file.

The system parameter managing unit 164 manages variables of the system, including initial values of the display size of the node and the type of font. The system history managing unit 165 manages the editing histories of the positions of the nodes displayed on the screen and the edition of the nodes.

It should be noted that the hypertext data managing section 150 accesses the hypertext file storage section 140. In the hypertext system managing section 160, the node/link managing unit 163 and the system managing unit 166 transfer necessary data to each other, and these managing units access the hypertext data managing section 150, as required.

In this embodiment, symbol marks serving as information for classification are objects symbolizing the qualitative nature of objects, and are represented by graphics, characters, bit maps, and the like. As symbol marks, it is possible to adopt a method of changing the color display of objects. In a case where the overall display screen of the display unit 110 is considered as an object, objects to which such symbol marks can be added include, in addition to the hypertext within the aforementioned graphics editing nodes, windows, icons, nodes, and other similar objects that are being displayed on that display screen.

It should be noted that, in this embodiment, the aforementioned adding means, the moving means, and the transcribing means are realized by the node type managing unit 161.

In the information classification supporting apparatus of this embodiment, on an graphics editing node in a hypertext system in which objects, including characters, graphics, graphs, and images, as well as nodes in which they are stored and links for designating the nodes, can be present on the display screen in a scattered form, it is possible to collect only the information which has been edited on the graphics editing node by classifying the information by adding symbol marks thereto. Also, it is possible to copy the thus-classified information onto another node in the hypertext.

Figure 2:
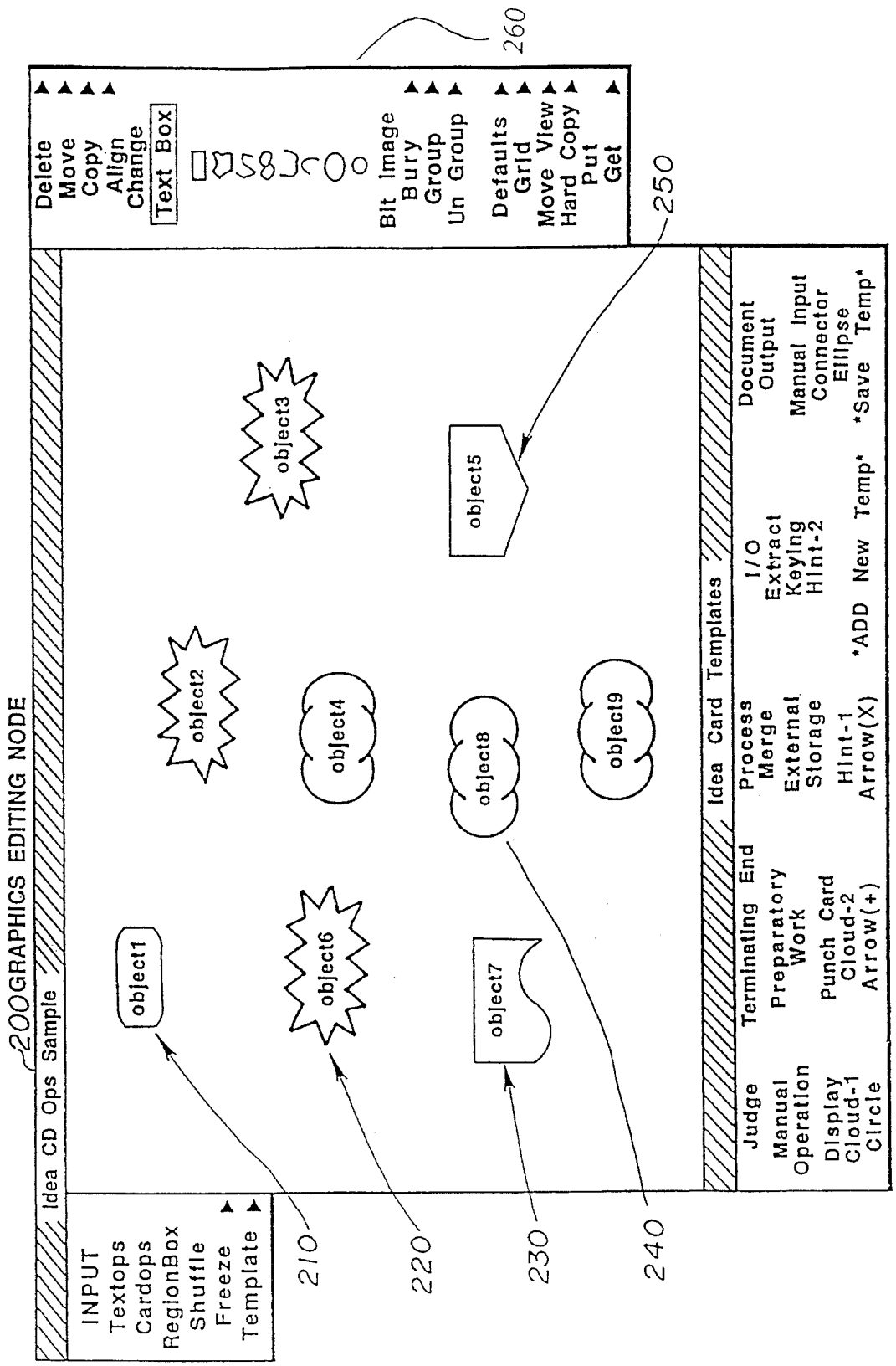
FIG. 2 is a diagram illustrating an example of a graphics editing node in accordance with the embodiment.

FIG. 2 shows an example of the graphics editing node in which information (objects) can be present on the display screen in a scattered form.

FIG. 2 shows a state in which specific symbol marks are added to objects 1–9 which are present in a scattered form in a graphics editing node 200 being displayed on the display screen. Here, the objects 1–9 are constituted by character rows, graphics, graphs, and images as well as nodes in which they stored and links for designating them. In this example, as the symbol marks, five types of symbol marks denoted by reference numerals 210–250 are being displayed, as shown in FIG. 2. As such symbol marks are added to the objects, the symbol marks are combined with the original objects. It should be noted that processing for combination the symbol marks and the objects will be described later in detail. The addition of the symbol marks is performed by selecting a desired item from a menu 260 for designating the symbol marks. Data indicating the symbol marks (irrespective of those registered by the system or by the user) which are present in the menu 260 is managed by the node data managing unit 151.

Referring now to FIGS. 3(a) to 3(d), a description will be given of processing for sorting out information classified on the graphics editing node and copying the classified information onto a node of the hypertext.

Figure 3B:
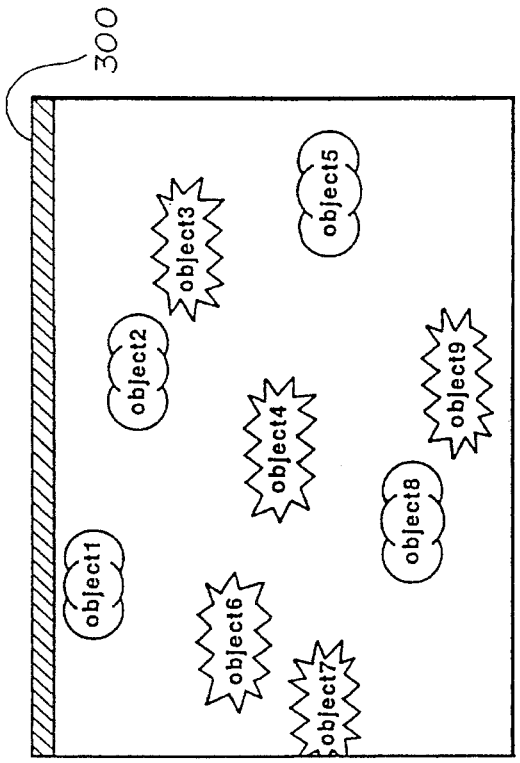
FIGS. 3(a) to 3(d) are diagrams illustrating a classifying function through the addition of symbol marks in accordance with the embodiment.
Figure 3D:
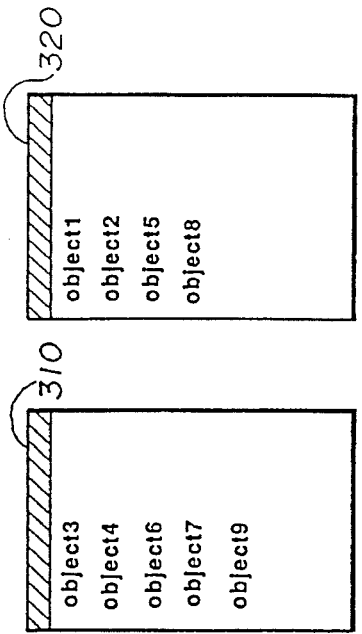
Figure 3A:
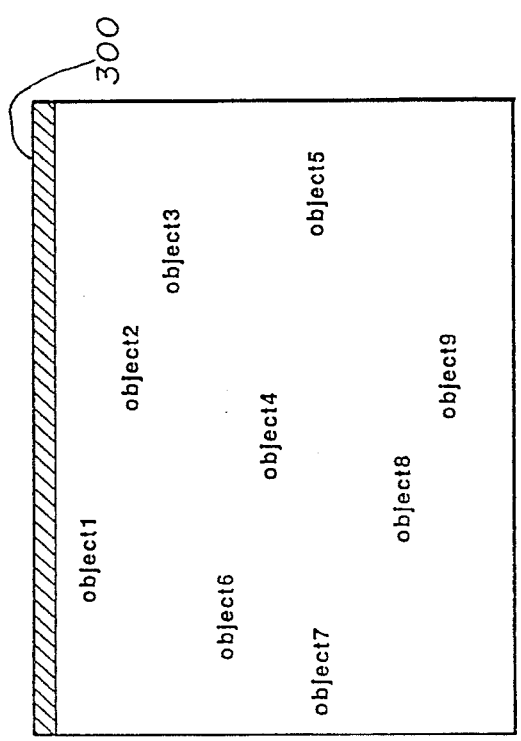

Now, it is assumed that, as shown in FIG. 3(a), the objects 1–9 are arranged two-dimensionally in a graphics editing node 300. In this state, if the user designates items respectively corresponding to the symbol marks 220, 240 shown in FIG. 2 from the menu 260 (see FIG. 2), and further designates objects to which these symbol marks are to be added, the objects 1–9 and the symbol marks are combined. Hence, the state of display shown in FIG. 3(a) is changed to the state of display shown in FIG. 3(b). Here, if attention is focused on FIG. 3(b), it can be seen that an identical symbol mark is added to the objects 1, 2, 5, and 8, and an identical symbol mark different from the foregoing symbol mark is added to the objects 3, 4, 6, 7, and 9.

Figure 3C:
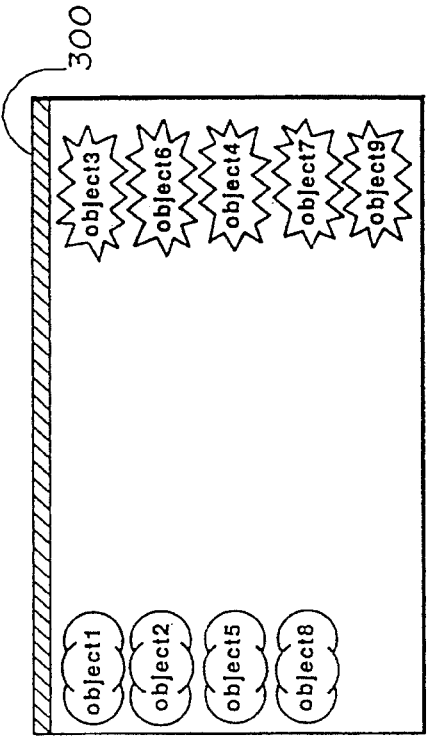

In this state of display, if the user performs a predetermined operation for sorting out the objects with the symbol marks added thereto, those objects are sorted out in accordance with the properties of the symbol marks. There are two methods of sorting out. One method is to sort out the objects and display them again in the graphics editing node 300 in accordance with the respective properties of the symbol marks, as shown in FIG. 3(c).

In another method, as shown in FIG. 3(d), the objects are sorted out in accordance with the respective properties of the symbol marks. Corresponding objects are then copied onto nodes 310, 320 (these nodes may be newly generated ones or may be designated ones which have already been generated) which differ from the graphics editing node 300 and which are displayed on the display screen of the display unit 110, in correspondence with the groups of objects thus sorted out.

It should be noted that the properties of the symbol marks include the types of shade (types of symbol marks), types of lines for forming the marks even if they have the same shape (dotted dash lines and dotted lines), and color information (capable of displaying the color of a line for forming the mark or of displaying the color of the entire object when the mark is combined with the object) representing the marks even if the marks have the same shade.

Figure 4:
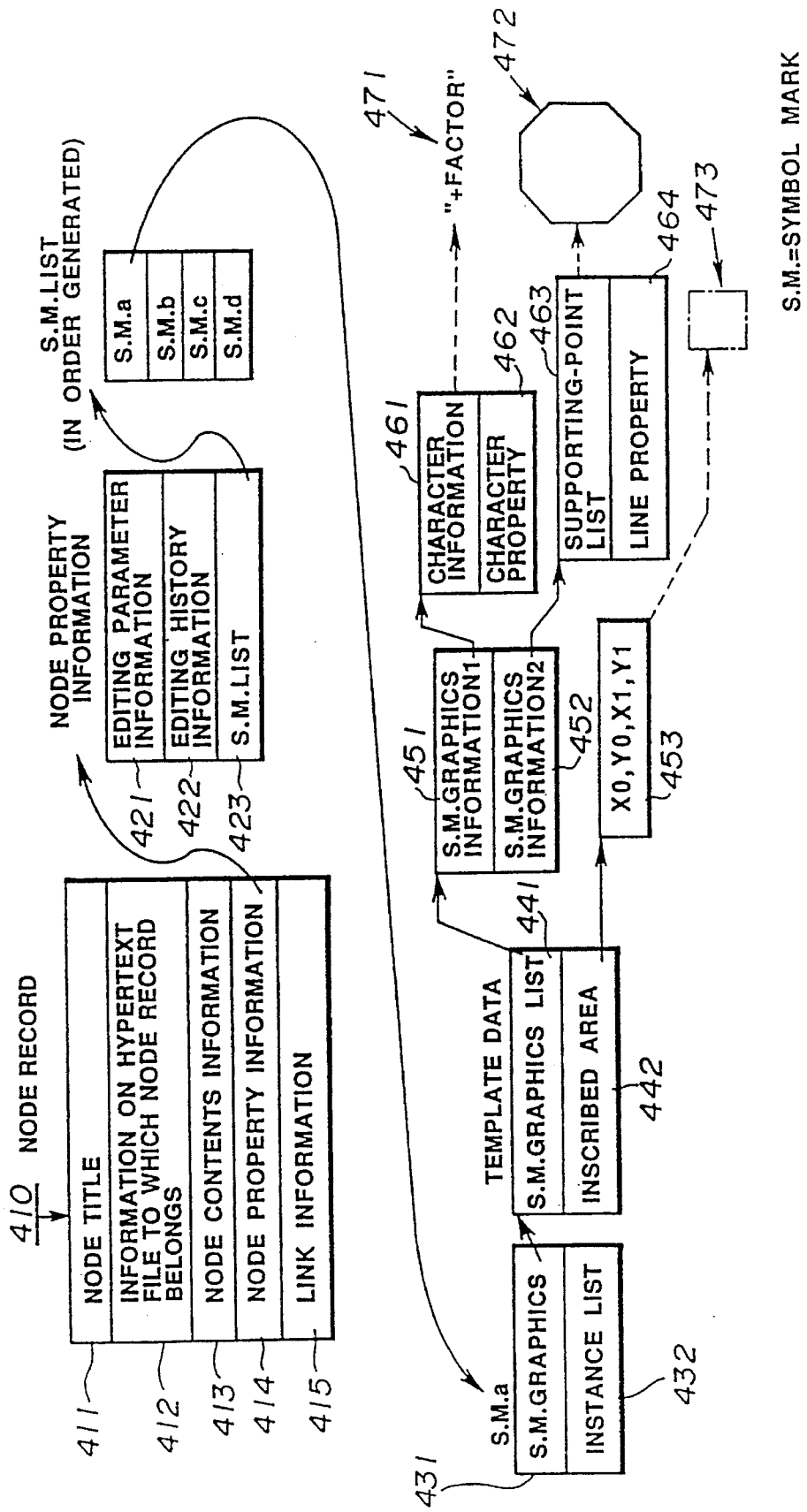
FIG. 4 is a diagram illustrating an example of information concerning symbol marks which the graphics editing node has in accordance with the embodiment.

When the graphics editing node is displayed on the display screen, information concerning the symbol marks (all the symbol marks which are present in the menu 260 shown in FIG. 2) which that node has is stored in the node data managing unit 151. An example of that information is shown in FIG. 4. In the example shown in this drawing, the information concerning the symbol marks is comprised of a node record 410. The node record 410 comprises a node title 411, information 412 on a hypertext file to which the node record 410 belongs, content information 413, node property information 414, and link information 415.

From the node property (node attribute) information 414, a linkage is provided to node property information which comprises editing parameter information 421, editing history information 422, and a symbol mark list 423. A list of symbol marks is registered in the symbol mark list 423 in the order in which they were generated (in this example, they are listed in the order of the symbol marks a, b, c, and d). Here, a symbol mark graphics 431 and an instance list 432 are registered in correspondence with the list of the symbol marks a. In an initial state, nothing is registered in the instance list 432.

From the symbol mark graphics 431, a linkage is provided to template data which comprises a symbol mark graphics list 441 and an inscribed area 442. From the symbol mark graphics list 441, a linkage is provided to a symbol mark graphics information 451 which points to character information 461 and a character property 462, and to symbol mark graphics information 452 which points to a supporting-point list 463 and a line property 464.

It should be noted that, in this example, a character row 471 of "+ factor" is stored in the character information 461, while data on each coordinate (supporting point) capable of representing polygonal graphics 472 is stored in the supporting-point list 463.

Meanwhile, from the inscribed area 442, a linkage is provided to a list 453 of minimum X-Y coordinates (X0, Y0) and maximum X-Y coordinates (X1, Y1). An inscribed area 473 of the graphics 472 generated on the basis of the supporting-point list 463 can be determined on the basis of the X-Y coordinates pointed to from the inscribed area 442.

Since the example shown in this drawing is a case where the symbol mark is comprised of the character row 471 of "+ factor" and the polygonal graphics 472, data is respectively recorded in the character information 461 and the supporting-point list 463. However, in a case where the symbol mark is comprised of a character row only, data is recorded only in the character information 461, while in a case where the symbol mark is comprised of graphics only, data is recorded only in the supporting-point list 463.

Figure 5:
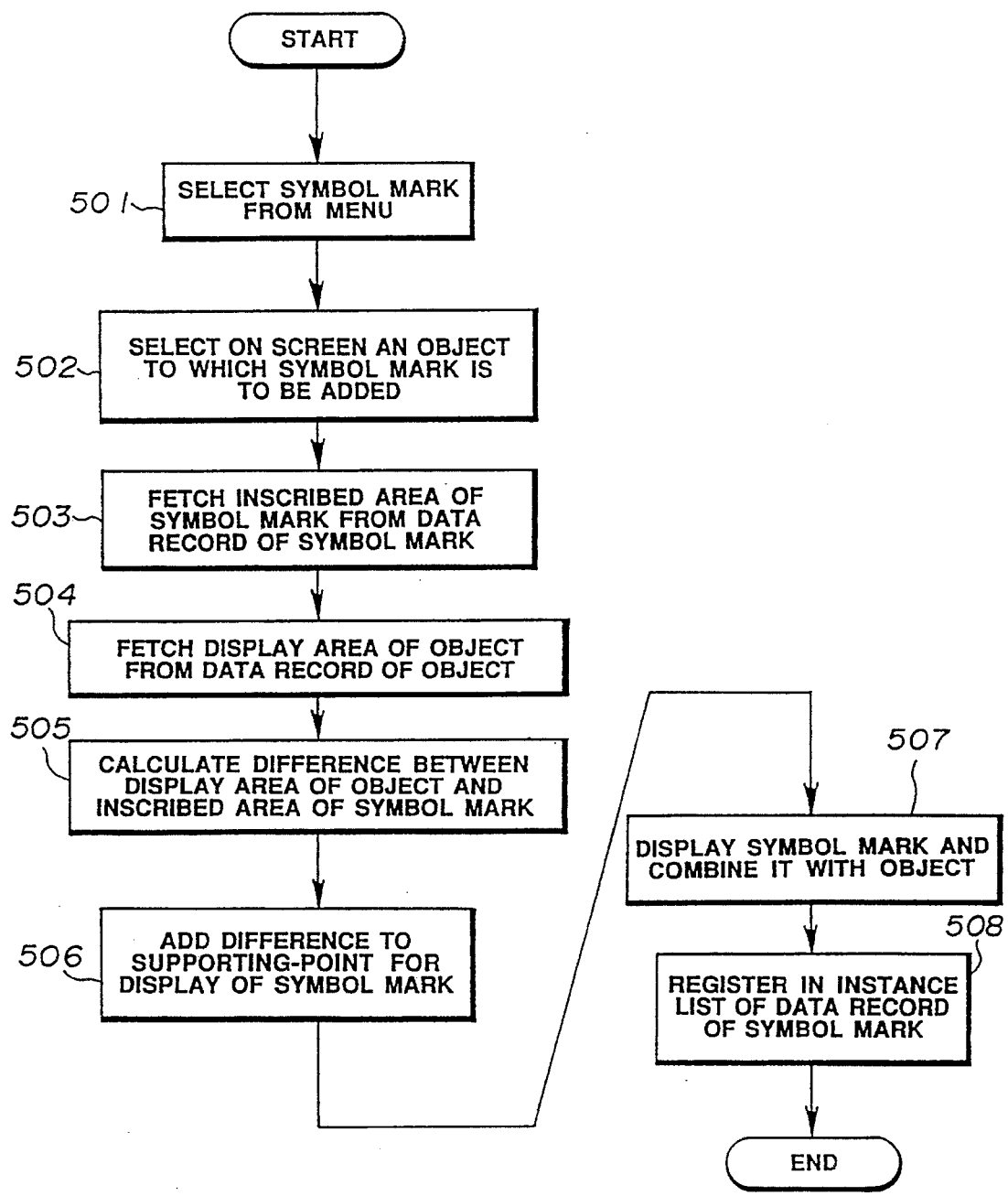
FIG. 5 is a flowchart illustrating a processing operation for combining a symbol mark and an object in accordance with the embodiment.

Referring now to FIGS. 5 and 6, a description will be given of a mechanism for adding symbol marks to information scattered on the display screen on the graphics editing node, i.e., of processing for combining information (objects) and the symbol marks.

It should be noted that FIG. 5 shows a flowchart illustrating a processing operation for combining them, while FIGS. 6(a) to 6(e) are diagrams illustrating the processing steps therefor, in which graphics and a character row are represented by a coordinate system.

As shown in FIG. 5, by operating the mouse 130, the user selects an item corresponding to a desired symbol mark from the menu 260, shown in FIG. 2, which is displayed on the screen (Step 501). Then, an object to which that symbol mark is to be added is selected on the display screen from the objects in the graphics editing node 200, shown in FIG. 2, which is displayed on the screen (Step 502).

The fact that the objects are present in the graphics editing node and are displayed on the screen, and that the menu 260 shown in FIG. 2 is being displayed on the screen means that data concerning the symbol marks and data concerning the objects being displayed on the display screen are stored in the node data managing unit 151.

Accordingly, the node type managing unit 161 accesses the node data managing unit 151 to fetch an inscribed area of the symbol mark from the data record of the symbol mark (Step 503), and fetches a display area of the object from the data record of the object (Step 504).

Figure 6A:
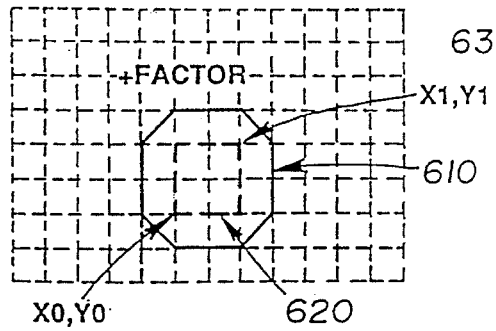
FIGS. 6(a) to 6(e) are diagrams illustrating the processing steps for combining the symbol mark and the object in accordance with the embodiment.
Figure 6B:
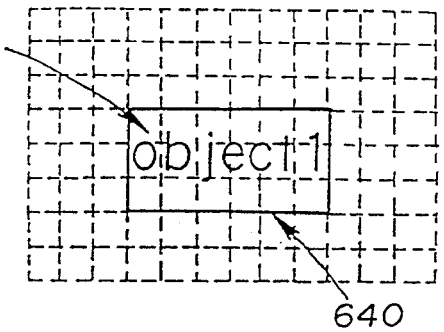
Figure 6C:
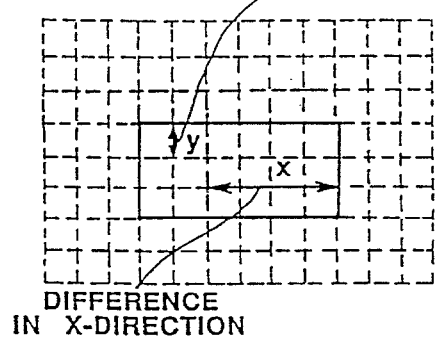

Here, it is assumed that graphics corresponding to the symbol mark a in the data structure shown in FIG. 4 is selected as the symbol mark, and that that symbol mark is represented as shown in FIG. 6(a). In addition, it is assumed that "object 1" is selected as the object, and that that object is represented as shown in FIG. 6(b).

Then, after fetching an inscribed area 620 of a symbol mark 610 and a display area 640 of an object 630, the node type managing unit 161 calculates differences between the display area 640 of the object 630 and the inscribed area 620 of the symbol mark 610 (Step 505). Here, it is assumed that the difference in the Y-direction is "y," and that the difference in the X-direction is "x."

Figure 6D:
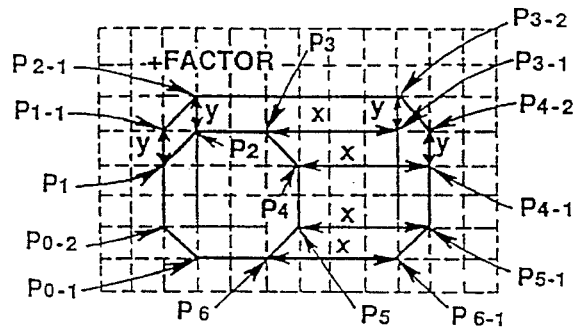
Figure 6E:
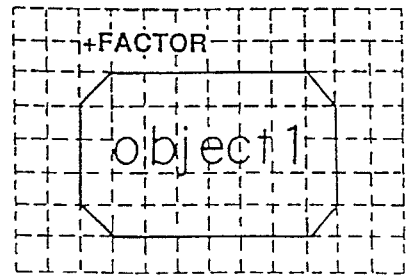

Furthermore, the node type managing unit 161 adds the differences obtained in Step 605 to the display supporting point of the symbol mark, as shown in FIG. 6(d) (Step 506).

Here, if it is assumed that the display supporting points of the symbol mark 610 are P0-1, P0-2, P1, P2, P3, P4, P5, P6 represented by the X-Y coordinates, as shown in FIG. 6(d), the following arithmetic processing is effected in Step 506.

That is, the coordinates at the display supporting points P0-1, P0-2 are left as they are. The value "y" is added to the Y-coordinate of the X-Y coordinates at each of the display supporting points P1, P2. As a result, the display supporting points P1, P2 are moved to the positions of P1-1, P2-1. In addition, the value "x" is added to the X-coordinate of the X-Y coordinates at each of the display supporting points P3, P4, P5, P6. As a result, the display supporting points P3, P4, P5, P6 are moved to the positions of P3-1, P4-1, P5-1, P6-1. Furthermore, the value "y" is added to the Y-coordinate of the X-Y coordinates at each of the display supporting points P3-1, P4-1. As a result, the display supporting points P3-1, P4-1 are moved to the positions of P3-2, P4-2. Accordingly, a final symbol mark becomes graphics which is represented by the respective display supporting points (X-Y coordinates) P0-1, P0-2, P1-1, P2-1, P3-2, P4-2, P5-1, P6-1.

Then, the node type managing unit 161 displays the symbol mark obtained by taking the results of processing in Step 506 into consideration, and combines that symbol mark and the object (Step 507). Subsequently, the node type managing unit 161 registers that information (the symbol mark in which the object 1 and the differences are taken into consideration) in the instance list of the data record of the symbol mark (Step 508). Subsequently, the processing ends.

Figure 7:
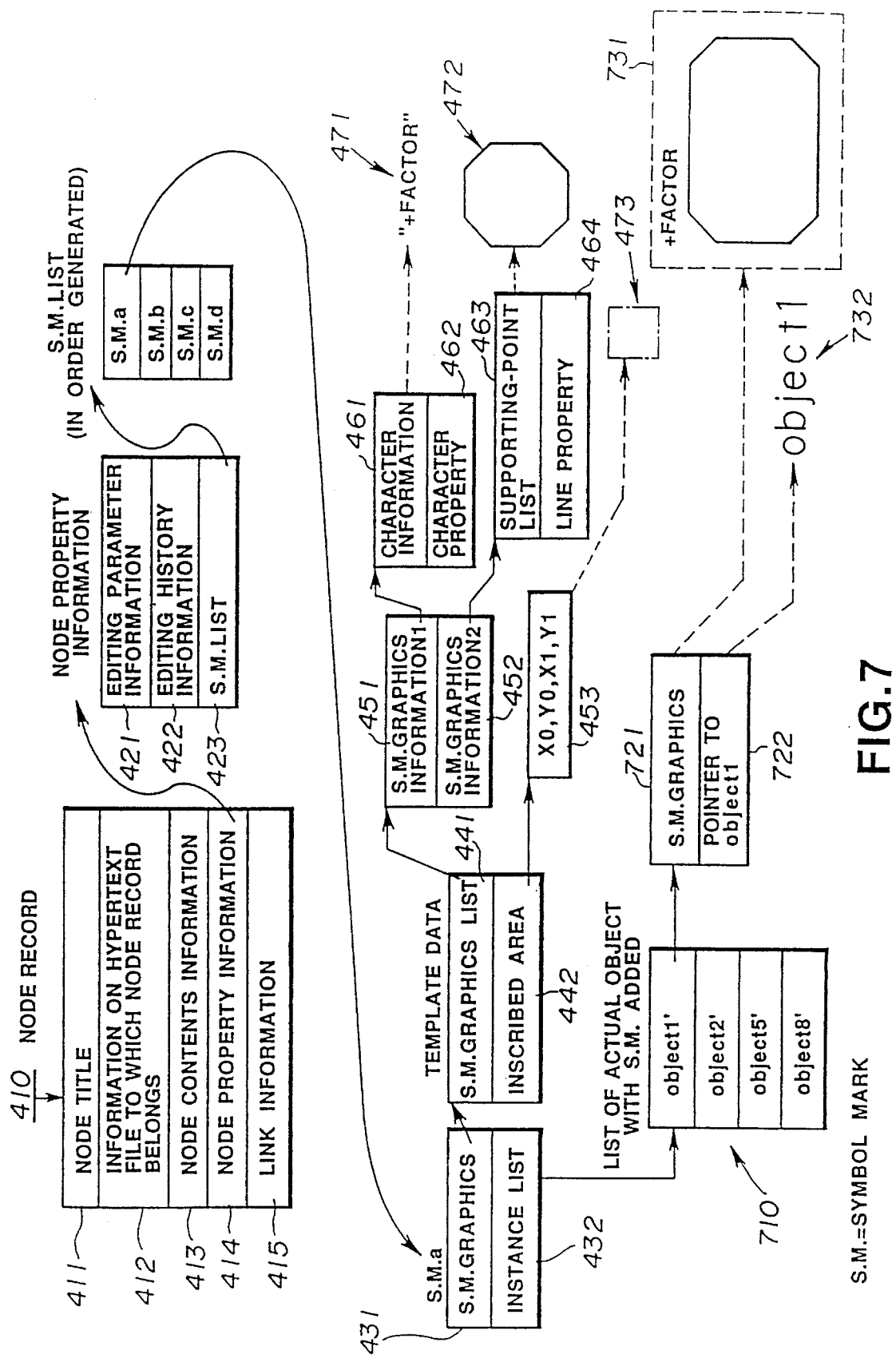
FIG. 7 is a diagram illustrating an example of information concerning symbol marks which the graphics editing node has after the symbol mark and the object are combined in accordance with the embodiment.

FIG. 7 illustrates an example of the information concerning symbol marks which the graphics editing node has after the information (objects) and the symbol marks are combined in the above-described manner. The contents of the information concerning the symbol marks shown in this drawing are such that the actual data is registered in the instance list 432 in the information concerning the symbol marks shown in FIG. 4. That is, from the instance list 432, a linkage is provided to a list 710 of actual objects with the symbol marks added thereto. In this list 710, from the "object 1," a linkage is provided to a symbol mark graphics 721 and a pointer 722 to the "object 1." From the symbol mark graphics 721, a linkage is provided to an actual symbol mark obtained by taking the aforementioned differences into consideration. From the pointer 722, a linkage is provided to the "object 1," which is the actual object.

Referring now to FIGS. 8 and 9(a) to 9(d), a description will be given of processing in which the information with the symbol marks added thereto is moved on the graphics editing node in accordance with the properties of the symbol marks.

Figure 8:
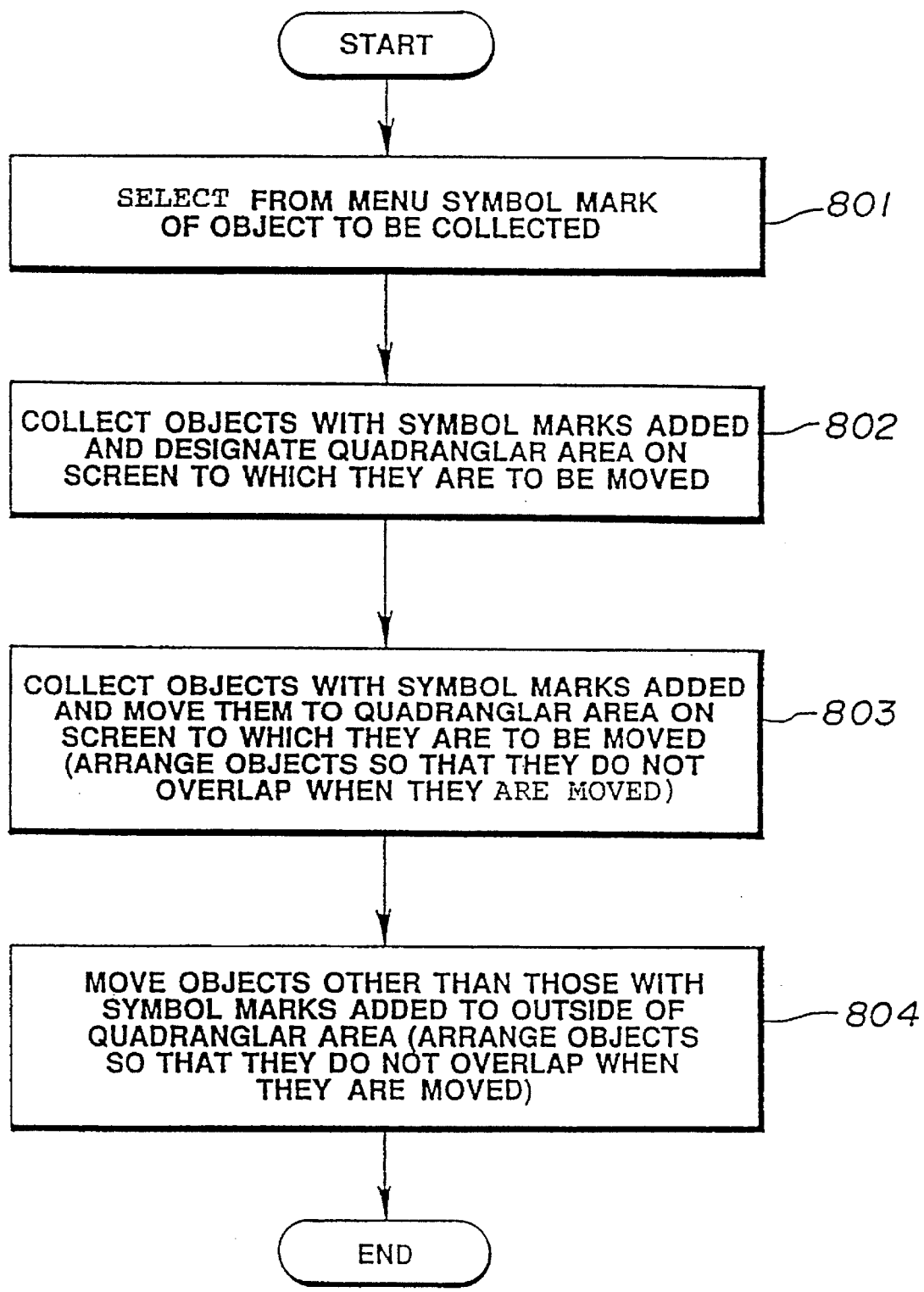
FIG. 8 is a flowchart illustrating a processing operation for moving information with the symbol marks added thereto on a display screen in accordance with the properties of the symbol marks in accordance with the embodiment.

FIG. 8 shows a flowchart illustrating a processing operation therefor, while FIGS. 9(a) to 9(d) show diagrams illustrating the processing steps therefor.

As shown in FIG. 8, by operating the mouse 130, the user selects the symbol mark of objects to be collected from the menu 260 shown in FIG. 2 (Step 801). Here, it is assumed that, in the state of display shown in FIG. 9(a), the symbol mark denoted by reference numeral 910 shown in FIG. 9(a) is selected from the menu 260 shown in FIG. 2.

The user then designates a quadrangular area on the display screen to which the objects with the symbol mark added thereto are to be moved after they are collected (Step 802). In this embodiment, as for the designation of the quadrangular area, a method is adopted in which a starting-point position 920, for instance, is designated by operating the mouse 130, and a terminating-point position 930, for instance, is designated by further moving the mouse 130.

If the symbol mark to be moved and the quadrangular area to which the symbol mark is to be moved are designated by the user, the node type managing unit 161 collects the objects with the symbol mark added thereto and moves them to the quadrangular area on the screen to which they are to be moved. At that juncture, at the time of movement, the objects are arranged in such a manner that they do not overlap (Step 803). Here, if it is assumed that a quadrangular area 940 indicated by dotted lines shown in FIG. 9(c) has been designated, the objects 1, 2, 5, 8 are moved to the quadrangular area 940 in such a manner that they do not overlap. At this point of time, the objects other than those objects remain as they are.

Figure 9B:
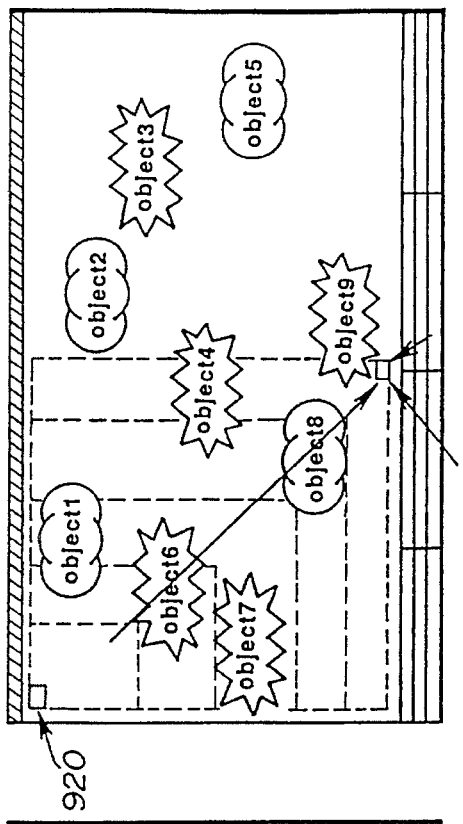
FIGS. 9(a) to 9(d) are diagrams illustrating the processing steps for moving the information with the symbol marks added thereto on the display screen in accordance with the properties of the symbol marks in accordance with the embodiment.
Figure 9D:
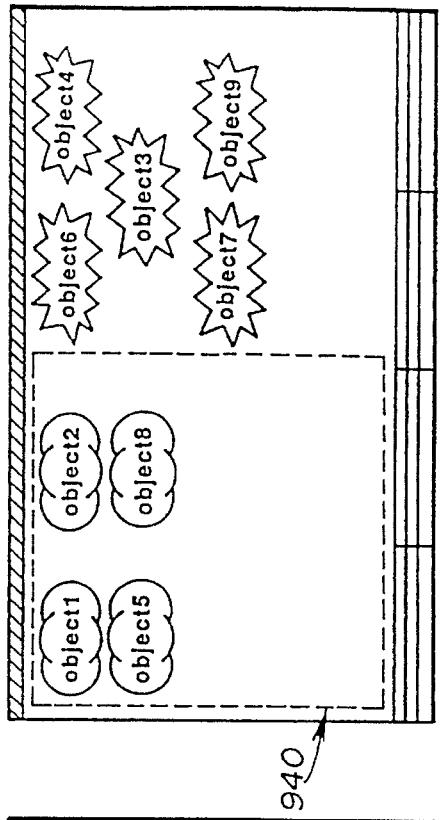
Figure 9A:
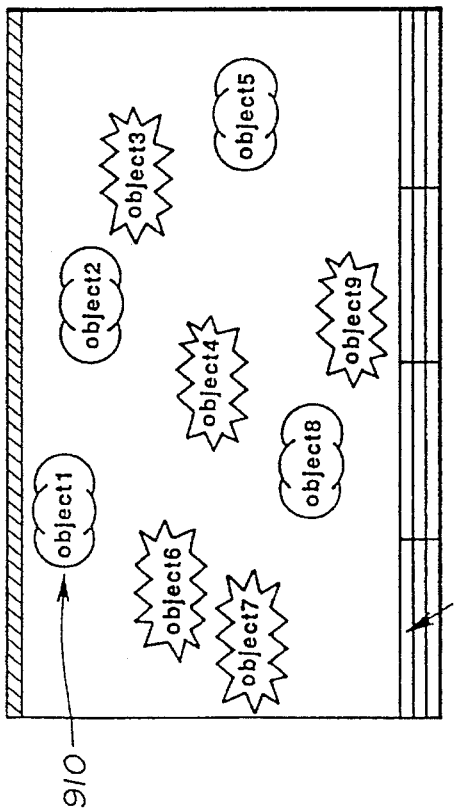
Figure 9C:
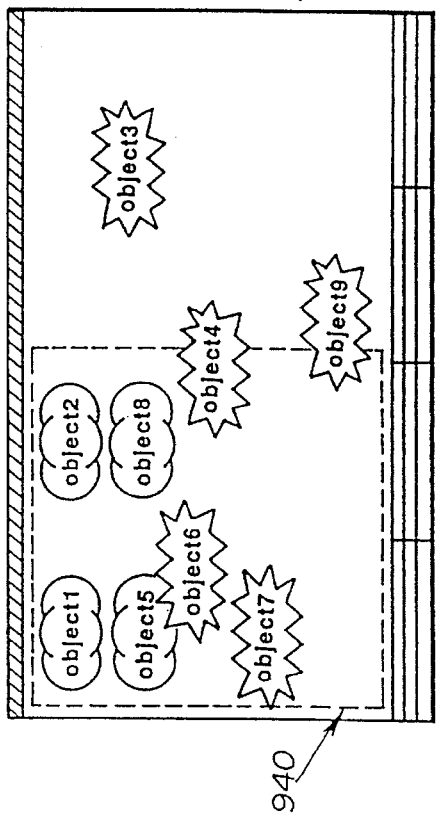

If the objects are moved in the above described manner, the node type managing unit 161 moves the objects other than the objects selected in Step 801 and having the symbol mark added thereto, to outside the quadrangular area 940 (see FIG. 9(c)) designated in Step 802, as shown in FIG. 9(d). At that juncture, at the time of movement, the objects are arranged in such a manner that they do not overlap (Step 804).

It should be noted that, the quadrangular area 940 may be either displayed, as shown in FIG. 9(d), or deleted after completion of the classification of the objects. Whether or not the quadrangular area is displayed can be set arbitrarily.

Figure 10:
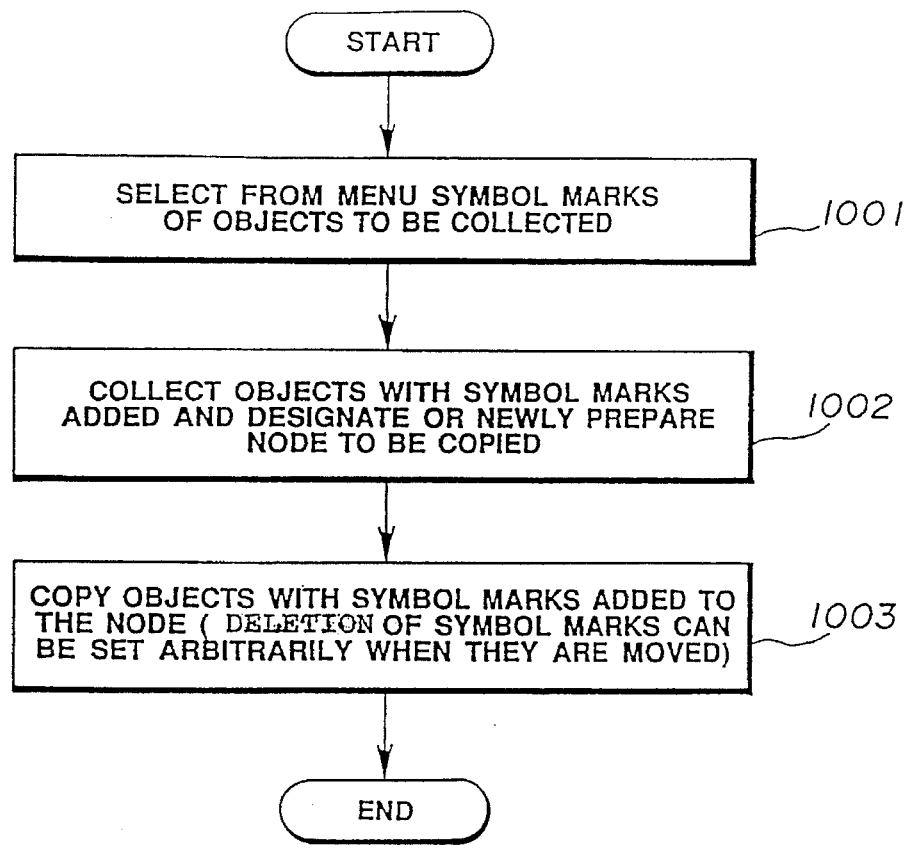
FIG. 10 is a flowchart illustrating a processing operation for transcribing the information with the symbol marks added thereto onto a node in accordance with the embodiment.
Figures 11A, 11B:
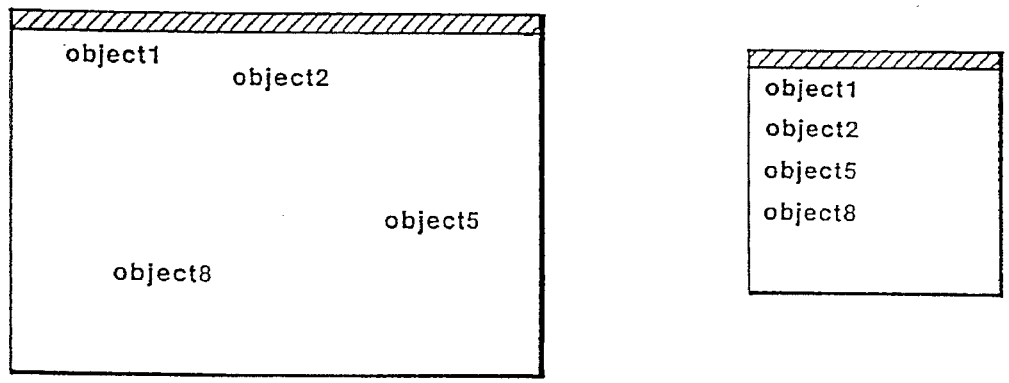
FIGS. 11(a) and 11(b) are diagrams illustrating the processing steps for transcribing the information with the symbol marks added thereto onto the node in accordance with the embodiment.

Referring now to FIGS. 10 and FIGS. 11(a) and 11(b), a description will be given of processing for transcribing information with the symbol mark added thereto onto a designated node, by designating a node corresponding to the property of the symbol mark.

It should be noted that FIG. 10 shows a flowchart illustrating a processing operation therefor, while FIGS. 11(a) and 11(b) shows a diagram illustrating the processing steps therefor.

As shown in FIG. 10, the user selects a symbol mark of the objects to be collected from the menu (Step 1001). Here, it is assumed that, in the state of display shown in FIG. 9(a), the symbol mark indicated by reference numeral 910 shown in FIG. 9(a) has been selected from the menu 260 shown in FIG. 2. The user then collects the objects with the symbol mark added thereto, and either designates a node for copying among the nodes which have already been prepared and are being displayed on the display screen, or newly prepares a node (Step 1002).

If the symbol mark and the destination node for copying of the information with the symbol mark added thereto are thus designated by the user, the node type managing unit 161 copies the objects to which the symbol mark selected in Step 1001 is added, onto the node obtained by processing in Step 1002. At that juncture, at the time of movement, the deletion of the symbol mark can be set arbitrarily (Step 1003). It should be noted that, in copying the objects onto the node, a copying method differs depending on whether the destination node for copying is a graphics editing node or a text editing node. In the case of the graphics editing node, the group of objects are copied two-dimensionally, as shown in FIG. 11(a). Meanwhile, in the case of the text editing node, the group of objects are divided by carriage returns and are copied, as shown in FIG. 11(b).

In the above-described embodiment, a description has been given of processing in which the data with the information for classification (symbol marks) added thereto is moved on the display screen or transcribed onto a predetermined data storage area in accordance with the properties of the information for classification. Alternatively, the processing may be effected in the manner described below.

That is, by means of the node type managing unit 161, the data with the information for classification added thereto is deleted from the display screen, or the deleted data is displayed again (reproduced) on the display screen in accordance with the properties of the information for classification.

Specifically, since the symbol marks and data are held in the node managing unit 151, in a case where an instruction to the effect a deletion is to be effected is given, as for the data with the classifying information added thereto, the node type managing unit 161 provides an operation for prohibiting the display on the display screen (at that time the data itself is retained) in accordance with the properties of that information for classification. Meanwhile, in a case where an instruction to the effect that a restoration is to be effected is given, the node type managing unit 161 cancels the operation for prohibiting the display on the display screen.

Next, a description will be given of a user's interface for supporting the classification of a group of objects which are scattered on the display screen.

In this embodiment, the graphics editing nodes in the hypertext system in which the objects can be scattered on the display screen are defined as "idea cards." Objects, including character rows, graphics, graphs and images, as well as nodes in which they are stored and links for designating the nodes, are defined as "elements." Symbol marks are defined as "templates."

A description will be given of the template function.

Figure 12:
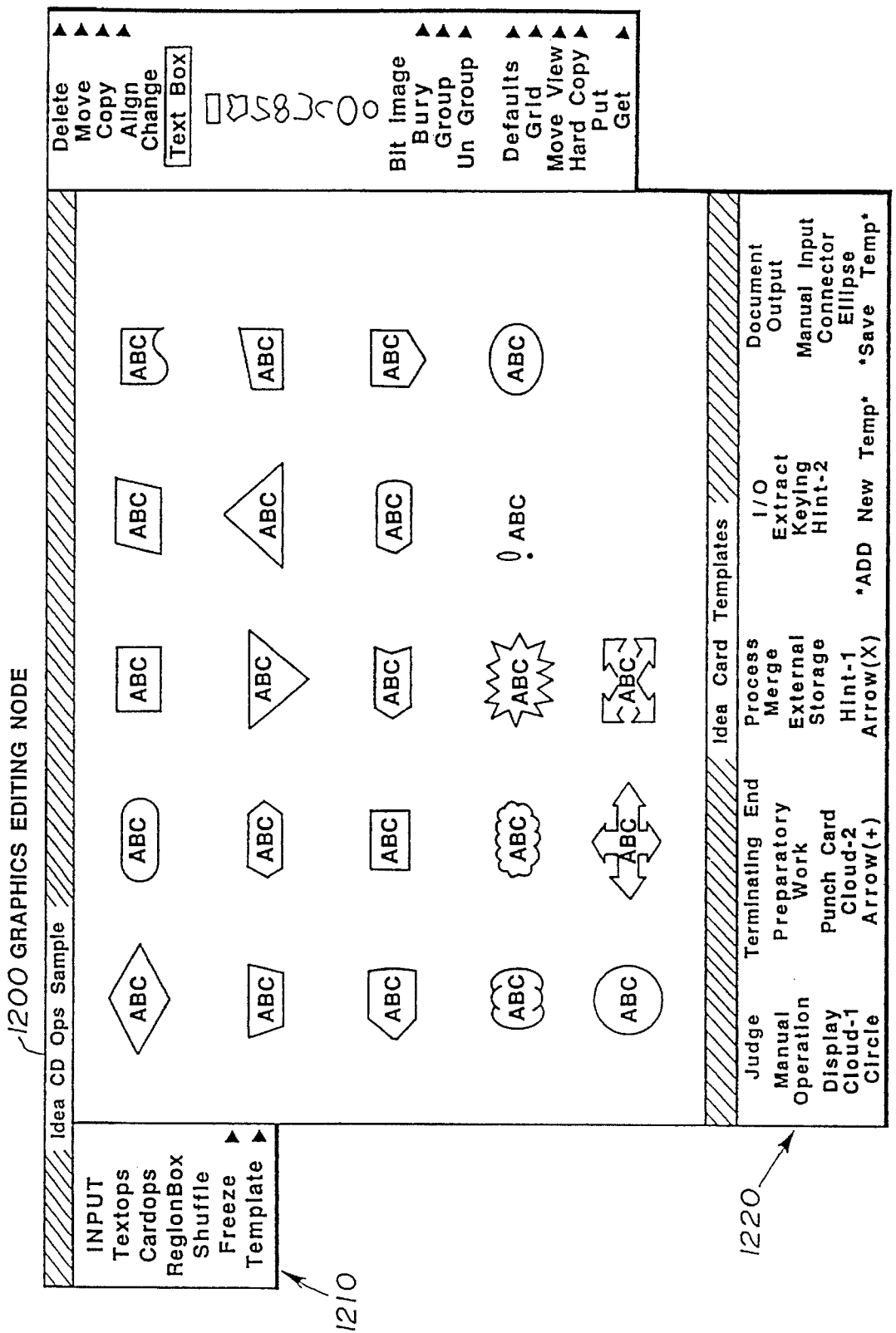
FIG. 12 is a diagram illustrating an idea card and a template function in accordance with the embodiment.

This function provides the function of allowing templates such as flowchart graphics to be superposed on the respective elements within an idea card 1200, as shown in FIG. 12.

The template function is executed by selecting a desired item from a template menu 1220 which is called by selecting "Template" in a left-attached menu 1210.

The template function comprises four functions including "application of templates to elements," "preparation and editing of user's templates," "saving and loading of user's templates," and "classification according to the type of template." Next, a description will be given of the respective functions which are the constituent elements of the template function.

1. Application of Templates to Elements

In the application of a template, a template to be applied is first designated in the template menu, and an element which is an object of application is then designated, thereby allowing the template to be displayed after adjusting the size to a form in which the element is included therein. If the object of application is not selected, a request is made to the user to designate an area of application, and the template is displayed in a form in which the designated area is included.

Here, if a plurality of elements which are objects of application are selected, the function is divided into two.

For instance, if it is assumed that the elements in the state of display shown in FIG. 13(a) have been selected, the application of the template differs depending on whether or not a predetermined key (e.g., a Meta key) has been pressed.

(a) If the Meta key has not been pressed, the template is displayed after its size is adjusted to a form in which all the selected elements are included, as shown in FIG. 13(b).

(b) Meanwhile, if the Meta key has been pressed, the templates are respectively displayed for the selected elements, as shown in FIG. 13(c).

It should be noted that, in this embodiment, the function (a) or (b) is executed depending on whether or not the predetermined key has been pressed, but an arrangement may be alternatively provided such that a function corresponding to an item selected from the items of a menu respectively indicating the functions (a) and (b) may be executed.

2. Preparation and Editing of User's Templates

The note type managing unit 161 provides 23 kinds of templates including a flowchart by means of default, and is further provided with the function of allowing the user himself or herself to prepare and register the templates.

The preparation of the user's template is executed by selecting "*Add New Temp*" in the template menu 1220 (see FIG. 12).

Next, a description will be given of the procedure of preparing a user's template.

(1) First, the user depicts in the idea card 1200 an element to be registered as a template.

(2) Then, the user selects "Add New Temp*" in the template menu 1220 (see FIG. 12).

If the "*Add New Temp*" is thus selected, the node type managing unit 161 prepares a user's template in the following processing procedure.

(3) A request for the element to be registered as the template is made to the user. The user designates that element in response to it.

(4) A request for an area to be included in the template is made to the user. The user designates that area in response to it.

(5) A request for the name of the template is made to the user. The user designates that name in response to it.

(6) A request for a comment at a time when the template menu 1220 is selected is made to the user. The user gives that comment in response to it.

(7) A request for a bit map to be displayed on the template menu 1220 is made to the user. The user designates that bit map in response to it. It should be noted that if the bit map is not designated, the node type managing unit 161 uses the name of the template.

(8) The template menu 1220 is updated. That is, the prepared user's template is registered in the template menu 1220.

The editing of the individual templates is effected by using unillustrated property sheets of the templates. The display of the property sheets of the templates can be effected as a desired template is selected from the template menu 1220 while a key for displaying the property sheet of the template is being pressed. On the property sheets, properties which are similar to those set in items (3) to (7) above can be edited.

3. Saving of User's Templates

This function provides the function of saving templates as files and reutilizing the same. The saving of the template is executed by selecting "*Save Temp*" in the template menu 1220. As for the templates that are saved, all the templates that are presently available are saved as files. The saving of the files is effected in the following procedure.

(1) The user selects "*Save Temp*" in the template menu 1220.

(2) Then, the user designates the name of a file.

(3) The hypertext file managing unit 153 then prepares a file with the designated file name and saves the template therein. It should be noted that since the file is in execute form, the file can be used again as the template by loading that file.

4. Classification According to the Type of Template

This function supports the operation of classifying the elements to which the templates have been applied, by means of the function of collecting the elements according to the type of template and by means of the function of freezing the elements according to the type of template.

As for the function of collecting the elements according the type of template, the type of template is first designated, and a quadrangular area is designated on the idea card, so as to move the relevant element to that quadrangular area.

As for the function of freezing the elements according to the type of template, by designating a type of the template of the element, only the display of the selected point of the element of the designated template type is suspended. Freezing referred to herein means that a selected point of graphics which is displayed when graphics is edited is not displayed forcibly. The purpose of this function is to avoid a careless selection of elements and improve the efficiency in operation by not displaying the selected point of the element whose position has already been determined.

As described above, in accordance with this embodiment, since visually represented symbol marks are added to the date displayed on the display screen in scattered form, the data can be moved and sorted out in accordance with the properties of the symbol marks, and can be saved in data storage areas. In addition, since the data displayed on the display screen in scattered form can be classified and sorted out by the addition of the visually represented symbol marks thereto, information can be operated more intellectually in a form which is easily recognized by a human being.

As described above, in accordance with the present invention, since information for classification is added to data displayed on the display screen in scattered form, and the data is moved and sorted out on the display screen or transcribed onto a data storage area according to the information for classification, it becomes unnecessary to manually effect operations with respect to the qualitative information after classification in the conventional manner. Hence, it becomes possible to automatically effect operations such as the sorting out, copying, storage of the qualitative information after classification, and to improve the operational efficiency.

It is to be understood that the present invention can be implemented in various forms without departing from its spirit and main features. Therefore, the foregoing embodiment is only illustrative in every aspect and should not be construed to be restrictive. The scope of the invention is shown by the appended claims, and is not restricted by the text of this specification. Furthermore, all modifications and changes which fall within the purview of equivalency of the claims fall within the scope of the present invention.

What is claimed is:

1. An information classification supporting apparatus comprising:

designating means for designating one or more data units displayed on a display screen for each of more than one classification attributes;

assigning means for assigning the each of more than one classification attributes to the designated data units, the designated data units being kept assigned with the one classification attribute after other designated data units are assigned with another classification attribute;

selecting means for selecting one classification attribute among the more than one classification attributes;

displaying means, in accordance with the one classification attribute selected by the selecting means, for reallocating and displaying the designated data units assigned with the one classification attribute at a predetermined display area on the display screen by separating from the other data units assigned with other classification attributes; and moving means for moving the designated data units assigned with the one classification attribute and being displayed by the displaying means.

2. An information classification supporting apparatus according to claim 1, wherein said assigning means marks the one or more data units assigned with the each of more than one classification attributes, with a symbol mark corresponding to the each of more than one classification attributes.

3. An information classification supporting apparatus according to claim 1, wherein said adding means comprises:

comparing means for comparing a size of a display area of the data being displayed on the display screen with a size of rectangular graphics which inscribes a sample of a frame to be added to the data and which is formed of sides parallel with vertical and horizontal directions of the display area;

setting means for setting the size in the vertical and horizontal directions of the frame on the basis of a result of comparison by said comparing means; and frame adding means for adding the frame to the data being displayed on the display screen by adjusting a size of the sample on the basis of a result of setting by said setting means.

4. An information classification supporting apparatus according to claim 1, further comprising second designating means for designating the predetermined display area on the display screen, to which the designated data units assigned with the one classification attribute are to be moved.

5. An information classification supporting apparatus comprising:

designating means for designating one or more data units displayed on a display screen for each of more than one classification attributes;

assigning means for assigning the each of more than one classification attributes to the designated data units, the designated data units being kept assigned with the one classification attribute after other designated data units are assigned with another classification attribute;

selecting means for selecting one classification attribute among the more than one classification attributes;

displaying means, in accordance with the one classification attribute selected by the selecting means, for reallocating and displaying the designated data units assigned with the one classification attribute at a predetermined display area on the display screen by separating from the other data units assigned with another classification attributes; and transcribing means for transcribing designated data units assigned with the one classification attribute and being displayed by the displaying means.

6. An information classification supporting apparatus according to claim 5, wherein said assigning means marks the one or more data units assigned with the each of more than one classification attributes, with a symbol mark corresponding to the each of more than one classification attributes.

7. An information classification supporting apparatus according to claim 5, wherein said adding means comprises:

comparing means for comparing a size of a display area of the data being displayed on the display screen with a size of rectangular graphics which inscribes a sample of a frame to be added to the data and which is formed of sides parallel with vertical and horizontal directions of the display area;

setting means for setting the size in the vertical and horizontal directions of the frame on the basis of a result of comparison by said comparing means; and frame adding means for adding the frame to the data being displayed on the display screen by adjusting a size of the sample on the basis of a result of setting by said setting means.

8. An information classification supporting apparatus comprising:

designating means for designating one or more data units displayed on a display screen for each of more than one classification attributes;

assigning means for assigning the each of more than one classification attributes to the designated data units, the designated data units being kept assigned with the one classification attribute after other designated data units are assigned with another classification attribute;

selecting means for selecting one classification attribute among the more than one classification attributes;

displaying means, in accordance with the one classification attribute selected by the selecting means, for reallocating and displaying the designated data units assigned with the one classification attribute at a predetermined display area on the display screen by separating from the other data units assigned with another classification attribute; and deleting means for deleting designated data units assigned with the one classification attribute and being displayed by the displaying means.

9. An information classification supporting apparatus according to claim 8, wherein said assigning means marks the one or more data units assigned with the each of one or more classification attributes, with a symbol mark corresponding to the each of more than one classification attributes.

10. An information classification supporting apparatus according to claim 9, further comprising restoring means for re-displaying the data deleted by said deleting means.

\* \* \* \* \*